US009286248B2

(12) United States Patent
Kegel

(10) Patent No.: US 9,286,248 B2
(45) Date of Patent: Mar. 15, 2016

(54) METHODS AND SYSTEMS FOR MOVING AND RESIZING I/O ACTIVITY LOGS

(71) Applicant: Advanced Micro Devices, Inc., Sunnyvale, CA (US)

(72) Inventor: Andrew Kegel, Redmond, WA (US)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 186 days.

(21) Appl. No.: 14/046,245

(22) Filed: Oct. 4, 2013

(65) Prior Publication Data
US 2015/0100708 A1    Apr. 9, 2015

(51) Int. Cl.
G06F 3/00       (2006.01)
G06F 13/10      (2006.01)
G06F 11/34      (2006.01)

(52) U.S. Cl.
CPC ............ G06F 13/10 (2013.01); G06F 11/3476 (2013.01)

(58) Field of Classification Search
None
See application file for complete search history.

(56) References Cited

U.S. PATENT DOCUMENTS 7,543,131 B2* 6/2009 Hummel et al. ............... 711/202
7,613,898 B2* 11/2009 Haertel et al. ................. 711/206
7,793,067 B2* 9/2010 Kegel et al. .................... 711/202
8,635,385 B2* 1/2014 Hummel et al. ................. 710/33

OTHER PUBLICATIONS

Steven W. Smith, "The Scientist and Engineer's Guide to Digital Signal Processing", 1997, 2 pages, Chapter 28—Digital Signal Processors, Circular Buffering.
Advanced Micro Devices, "AMD I/O Virtualization Technology (IOMMU) Specification Revision 2.00", Mar. 24, 2011, 167 pages.
TW Burger, "Intel® Virtualization Technology for Directed I/O (VT-d): Enhancing Intel Platforms for Efficient Virtualization of I/O Devices", Mar. 5, 2012, 8 pages, http://software.intel.com/en-us/articles.

* cited by examiner

*Primary Examiner* — Idriss N Alrobaye
*Assistant Examiner* — Richard B Franklin
(74) *Attorney, Agent, or Firm* — Park, Vaughan, Fleming & Dowler LLP

(57) ABSTRACT

A method of managing peripherals is performed in a device coupled to a processor in a computer system. For example, the method is performed in an input/output memory management unit (IOMMU) or a peripheral. The method includes recording information associated with I/O activity for one or more peripherals in a log that has a first base address. The method also includes, without pausing the I/O activity, specifying a second base address for the log and setting a head pointer and a tail pointer for the log to indicate that the log is empty. The second base address is distinct from the first base address.

20 Claims, 10 Drawing Sheets

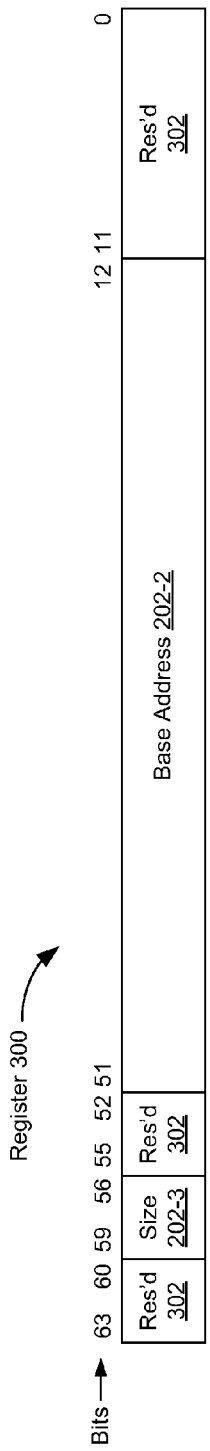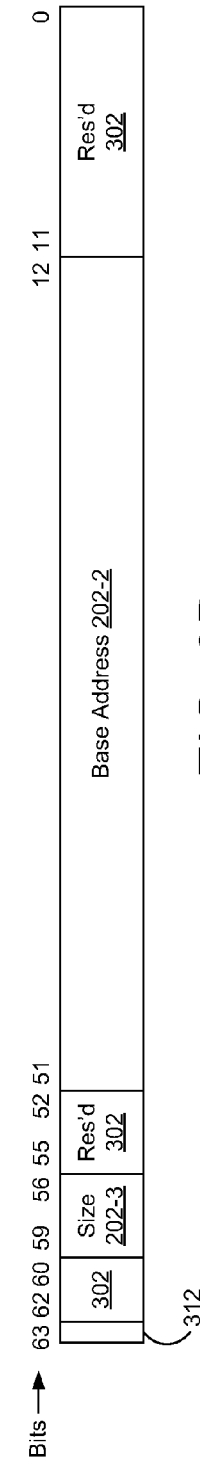
FIG. 3A
FIG. 3B

METHODS AND SYSTEMS FOR MOVING AND RESIZING I/O ACTIVITY LOGS

TECHNICAL FIELD

The present embodiments relate generally to management of peripherals in computing systems, and more specifically to moving and resizing logs that store information about input/output (I/O) activity.

BACKGROUND

An I/O memory management unit (IOMMU) may store information about I/O activity in one or more logs. It may be desirable to move or resize these logs during operation. Pausing I/O activity to move or resize a log will degrade system performance, however, and may cause system failure. Moving or resizing a log without pausing I/O activity risks creating a log entry at an incorrect memory location.

SUMMARY

Embodiments are disclosed in which a log for storing information regarding I/O activity is moved and/or resized without pausing the I/O activity, in a manner that ensures log entries are created in their intended memory locations.

In some embodiments, a method of managing peripherals is performed in a device coupled to a processor in a computer system. For example, the method is performed in an IOMMU or a peripheral. The method includes recording information associated with I/O activity in a log that has a first base address. The method also includes, without pausing the I/O activity, specifying a second base address for the log and setting a head pointer and a tail pointer for the log to indicate that the log is empty. The second base address is distinct from the first base address.

In some embodiments, a device to be coupled to a processor in a computer system includes a log to record information associated with I/O activity for one or more peripherals. The device also includes log control circuitry to change a base address for the log and set a head pointer and a tail pointer for the log to indicate that the log is empty, without pausing the I/O activity.

In some embodiments, a device to be coupled to a processor in a computer system includes a log to record information associated with I/O activity for one or more peripherals. The device also includes log control circuitry to move the log in memory without pausing the I/O activity.

In some embodiments, a non-transitory computer-readable storage medium stores one or more programs configured for execution by a processor. The one or more programs include an instruction to issue a command to a device coupled to the processor to change a base address for a log and to set a head pointer and a tail pointer for the log to indicate that the log is empty, without pausing I/O activity for one or more peripherals. The log is to record information associated with the I/O activity.

BRIEF DESCRIPTION OF THE DRAWINGS

The present embodiments are illustrated by way of example and are not intended to be limited by the figures of the accompanying drawings.

FIGS. 3A and 3B show examples of registers for the circular buffer of FIG. 2 in accordance with some embodiments.

Like reference numerals refer to corresponding parts throughout the figures and specification.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1A:
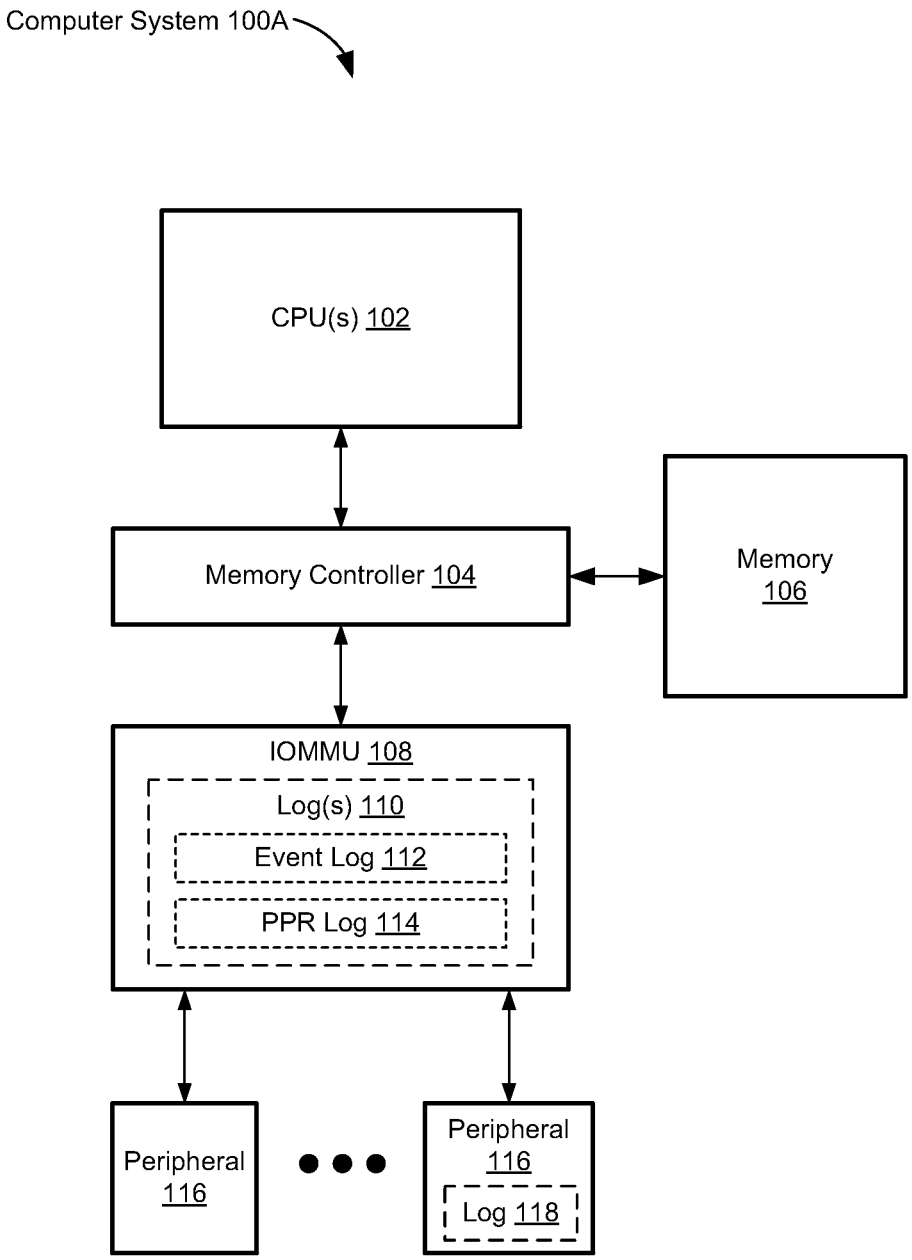
FIGS. 1A and 1B are block diagrams of computer systems in accordance with some embodiments.

FIG. 1A is a block diagram of a computer system 100A in accordance with some embodiments. The computer system 100A includes one or more CPUs 102, memory 106, and peripherals 116. The one or more CPUs 102 may each include one or more processor cores. The memory 106 includes main memory and may include one or more levels of cache memory. (The one or more CPUs 102 may also include one or more levels of cache memory.) In some embodiments, the main memory is implemented in dynamic random access memory (DRAM) and the one or more levels of cache memory are implemented in static random access memory (SRAM). Examples of peripherals 116 include, but are not limited to, network interface cards (NICs), other input/output (I/O) devices, and storage devices (e.g., hard-disk drives, solid-state drives such as flash drives, etc.).

A memory controller 104 couples the one or more CPUs 102 to the memory 106, thereby providing the one or more CPUs 102 with access to the memory 106.

The peripherals 116 are coupled to an input/output memory management unit (IOMMU) 108, which is coupled to the memory controller 104. The IOMMU 108 and memory controller 104 thus couple the peripherals 116 to the one or more CPUs 102 and to the memory 106. The IOMMU 108 may also be referred to, for example, as a peripheral MMU, a system MMU, a translation agent system, or virtualization technology for directed I/O (Vt-d). The IOMMU controls I/O activity for the peripherals 116. Among other functions, the IOMMU 108 performs address translation for the peripherals 116: it translates virtual addresses provided by the peripherals 116 into physical addresses in the memory 106. The peripherals 116 may use these physical addresses to perform direct memory access (DMA) in the memory 106, through the IOMMU 108. Such DMA operations are an example of the I/O activity that the IOMMU 108 controls.

The IOMMU 108 records information associated with the I/O activity in one or more logs 110. The one or more logs 110 may also be referred to as queues: they queue the information regarding the I/O activity for subsequent consumption by software running on the one or more CPUs 102. One example of a log 110 is an event log 112, which stores events (e.g., including errors) associated with the peripherals 116. Another example of a log 110 is a peripheral page request (PPR) log 114, which stores PPRs from the peripherals 116. A PPR resembles a page fault in that it requests allocation of a page in the memory 106. But unlike page faults, which are synchronous, PPRs are issued as interrupts, which are asynchronous. The event log 112 and the PPR log 114 are merely two examples of logs 110; other examples are possible. For example, a log 110 may store information regarding interrupts issued by the peripherals 116, user connections established through the peripherals 116, or failed attempts to connect to the computer system 100A through the peripherals 116.

A peripheral 116 (e.g., a NIC) may record information associated with its activity (e.g., information as described for the one or more logs 110) in a log 118.

While the one or more logs 110 are shown as being situated in the IOMMU 108, and the log 118 is shown as being situated in a peripheral 116, entries in the one or more logs 110 and/or the log 118 may be stored in the memory 106 (e.g., in main memory). The IOMMU 108 includes registers that store pointers to the entries along with other information that defines the one or more logs 110. For example, a log 110 may be implemented as a circular buffer defined by values stored in registers in the IOMMU 108 and having entries stored in the memory 106 (e.g., in main memory), as described below with respect to FIG. 2. Because of the presence of these registers in the IOMMU 108, the one or more logs 110 are considered to be part of the IOMMU 108, even with the entries being stored in the memory 106. Similarly, a peripheral 116 may include registers that store pointers to the entries along with other information that defines the log 118. Because of the presence of these registers in the peripheral 116, the log 118 is considered to be part of the peripheral 116, even with the entries being stored in the memory 106.

In some embodiments, the memory controller 104 is integrated with the one or more CPU(s) 102, such that it is situated on the same semiconductor die (and thus the same chip) as the one or more CPU(s) 102. Alternatively, the memory controller 104 may be situated on a separate chip from the one or more CPU(s) 102. The IOMMU 108 may be situated on the same chip as the memory controller 104 and/or the one or more CPU(s) 102, or on a different chip.

Figure 1B:
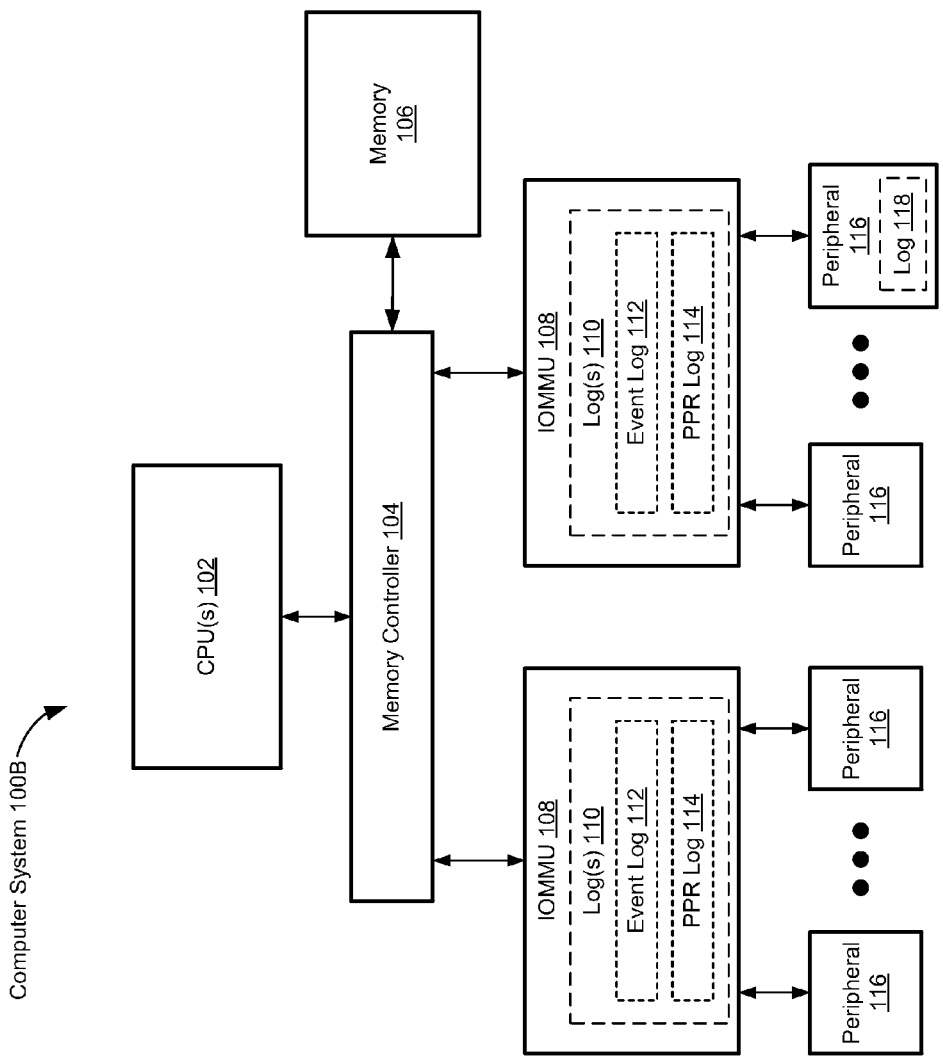

FIG. 1B is a block diagram of another computer system 100B in accordance with some embodiments. In the computer system 100B, a first group of peripherals 116 is coupled to a first IOMMU 108 and a second group of peripherals 116 is coupled to a second IOMMU 108. The first and second IOMMUs 108 are coupled to the memory controller 104 and thereby to the one or more CPUs 102 and the memory 106. The first IOMMU 108 controls I/O activity for the first group of peripherals 116 and includes one or more logs 110 in which it records information about this I/O activity. Likewise, the second IOMMU 108 controls I/O activity for the second group of peripherals 116 and includes one or more logs 110 in which it records information about this I/O activity. A peripheral 116 may include a log 118 to store information regarding its activity.

The computer systems 100A and 100B are merely examples of computer systems that use IOMMUs 108; other examples are possible. For example, a computer system may include more than two IOMMUs 108, each coupled to a respective group of peripherals 116 and including one or more logs 110. Each IOMMU 108 may be coupled to respective peripherals 116 through an I/O hub, which may include integrated peripherals 116.

Figure 2:
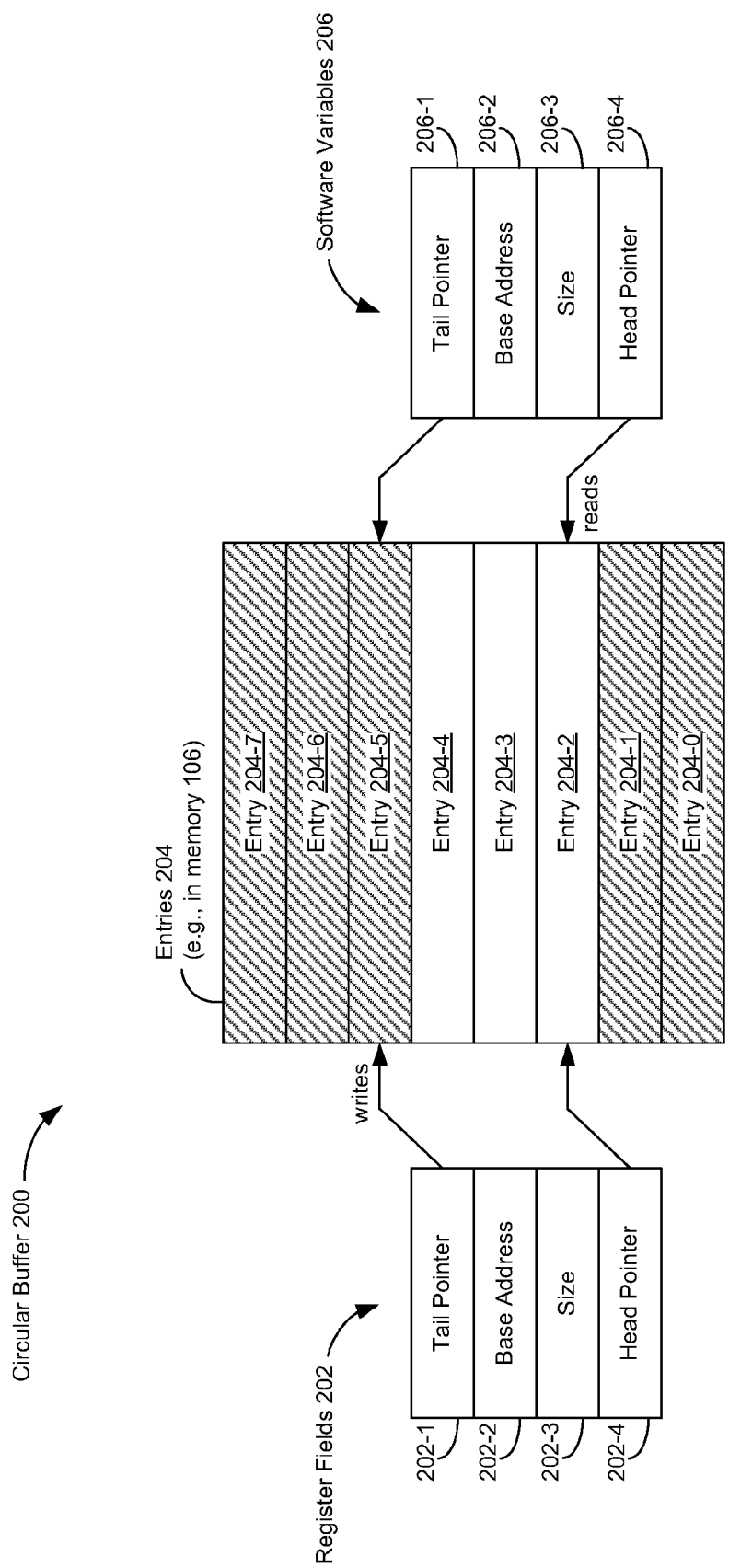
FIG. 2 is a block diagram of a circular buffer used to implement a log in accordance with some embodiments.

FIG. 2 is a block diagram of a circular buffer 200 used to implement a log 110 or log 118 (FIGS. 1A-1B) in accordance with some embodiments. Register fields 202 for the circular buffer 200 include a tail pointer register field 202-1 to store a tail pointer for the circular buffer 200, a base address register field 202-2 to store a base address of the circular buffer 200, a size register field 202-3 to store a size of the circular buffer 200, and a head pointer register field 202-4 to store a head pointer for the circular buffer 200. A plurality of entries 204 (e.g., entries 204-0 through 204-7) in the circular buffer 200 are stored in the memory 106 (e.g., in main memory). The base address is the address of a first entry 204-0 or portion thereof. The entries 204-0 through 204-7 are indexed by offsets from the first entry 204-0, such that the base address plus the size is the address of the last entry 204-7. In one example, each entry is 128 bits (i.e., 16 bytes) and the offsets are multiples of 16 (e.g., the index for entry 204-0 is +00, the index for entry 204-1 is +16, and the index for entry 204-7 is +112). In this example, the circular buffer is a 128-byte buffer. In general, however, the size and number of entries 204, and thus the overall size of the circular buffer 200, varies for different implementations.

In some embodiments, the head pointer points to the first valid entry 204 and the tail pointer points to the first invalid (i.e., empty) entry 204. The head pointer register field 202-4 thus stores the index for the first valid entry 204 and the tail pointer register field 202-1 thus stores the index for the first invalid entry 204. In the example of FIG. 2, the circular buffer 200 currently has three valid entries: entries 204-2, 204-3, and 204-4. The head pointer points to entry 204-2, which is the first valid entry 204. The tail pointer points to entry 204-5, which is the first invalid entry. (FIG. 2 merely illustrates one example of a pointer convention for a circular buffer; other examples are possible.)

The register fields 202 are included in one or more registers in an IOMMU 108 or peripheral 116. Two or more of the register fields 202 may be in the same register (e.g., as described below with respect to FIGS. 3A and 3B).

When the IOMMU 108 or peripheral 116 creates a new entry in the log 110 or log 118, it writes to the entry 204 to which the tail pointer points and then increments the tail pointer (wrapping around as necessary). If incrementing the tail pointer would cause the tail pointer to equal the head pointer (i.e., would cause the value in the tail pointer register field 202-1 to equal the value in the head pointer register field 202-4), then the circular buffer 200 is full. Adding another entry 204 when the circular buffer 200 is full would result in overflow.

Software running on the one or more CPUs 102 (FIGS. 1A and 1B) tracks variables 206 associated with the circular buffer 200. The variables 206 correspond to the register fields 202 and include, for example, a tail pointer variable 206-1, base address variable 206-2, size variable 206-3, and head pointer variable 206-4. In some embodiments, when the software reads, and thus consumes, an entry 204, it consumes the entry at the head of the circular buffer 204 (i.e., the first valid entry 204), as identified by the head pointer variable 206-4. For example, it consumes entry 204-2. The software then increments the head pointer variable 206-4 and writes the incremented value of the head pointer variable 206-4 to the head pointer register field 202-4. In the example of FIG. 2, the head pointer register field 202-4 would then store a pointer to the entry 204-3, as would the head pointer variable 206-4.

For security reasons, the register fields 202 are separated in address space so that software cannot write to all of the register fields 202 in a single operation. For example, the register fields 202 may be separated by thousands of bytes in address space. It may be desirable to move or resize the circular buffer 200, for example, if overflow is imminent (e.g., if the circular buffer 200 is full or nearly full). Moving and/or resizing the circular buffer 200 are performed by updating the values in the register fields 202. If I/O activity occurs in the middle of updating the register fields 202, at a time when the contents of the register fields 202 are inconsistent, then a new entry may be place in an incorrect memory location. This problem may be referred to as tearing. To avoid this problem, software could pause I/O activity while updating the register fields 202. Pausing I/O activity is not practical, however, because it may result in unacceptable performance degradation or even system failure.

In some embodiments, to allow the circular buffer 200 to be moved or resized without pausing I/O activity, the IOMMU 108 or peripheral 116 is configured to update the head and tail pointers automatically in response to a command to move or resize the circular buffer 200. For example, the IOMMU 108 or peripheral 116 is configured to reset the head and tail pointers such that they are equal. Setting the head and tail pointers to be equal indicates that the circular buffer 200 is empty. Furthermore, the base address register field 202-2 and size register field 202-3 may be located in the same register. The IOMMU 108 or peripheral 116 may then move or resize the circular buffer 200 in a single atomic operation, in response to a command from software to write to the register that includes the base address field 202-2 and size field 202-3. The result of this atomic operation is effectively a new, empty circular buffer 200 of a specified size and specified base address. The new circular buffer 200 is used for new entries in a log 110 or log 118. (Resizing the circular buffer 200 thus may be performed by moving the circular buffer 200 to a new base address and increasing the size.)

FIG. 3A shows an example of a register 300 that includes both the base address register field 202-2 and the size register field 202-3 in accordance with some embodiments. The register 300 is shown as a 64-bit register that may be written in a single operation. In general, the size of the register 300 may vary, but is chosen so that it can be written in a single operation. In addition to the base address register field 202-2 and the size register field 202-3, the register 300 includes multiple reserved register fields 302 that may be used to store other values or may be unused.

FIG. 3B shows an example of a register 310 that includes a register field 312 (e.g., a single bit) that, when set (e.g., to '1'), enables the size of the circular buffer 200 to be increased without resetting the head and tail pointers and without changing the base address. Setting the register field 312 thus disables the atomic operation that automatically resets the head and tail pointers when the size register field 202-3 and/or base address register field 202-2 are updated. Accordingly, when the register field 312 is set, the value in the size register field 202-3 may be increased without changing other register fields 202 for the circular buffer 200, thereby increasing the size of the circular buffer 200 without moving it. The register 310 also includes the base address register field 202-2, the size register field 202-3, and reserved fields 302.

Figure 4A:
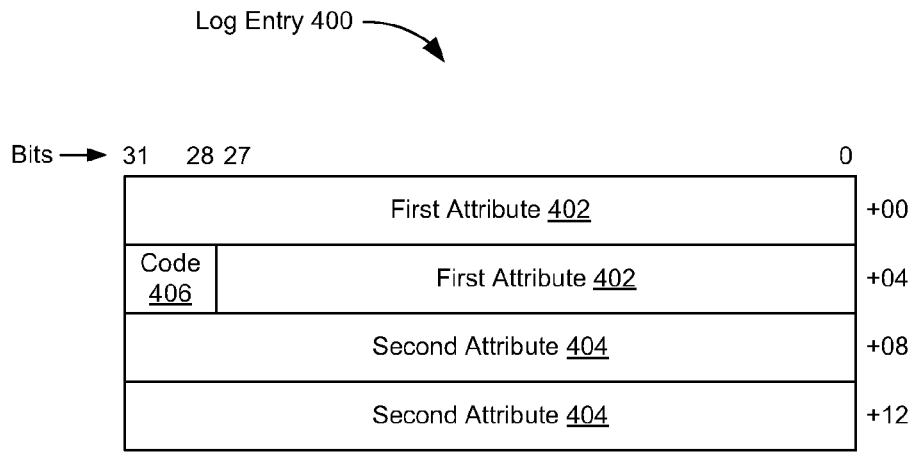
FIGS. 4A and 4B show examples of entries in a log in accordance with some embodiments.

FIG. 4A shows an entry 400 in a log 110 or log 118 in accordance with some embodiments. The entry 400 is an example of an entry 204 (FIG. 2). In the example of FIG. 4A, the entry 400 is a 128-bit entry divided into four 32-bit sections. More generally, the size and structure of the entry 400 may vary from embodiment to embodiment. The entry 400 includes a first attribute 402, a second attribute 404, and a code 406 that specifies a type of attribute for the first attribute 402 and second attribute 404. The code 406 indicates how to interpret the first attribute 402 and second attribute 404. The first attribute 402 and second attribute 404 therefore may be referred to as code-dependent operands.

Figure 4B:
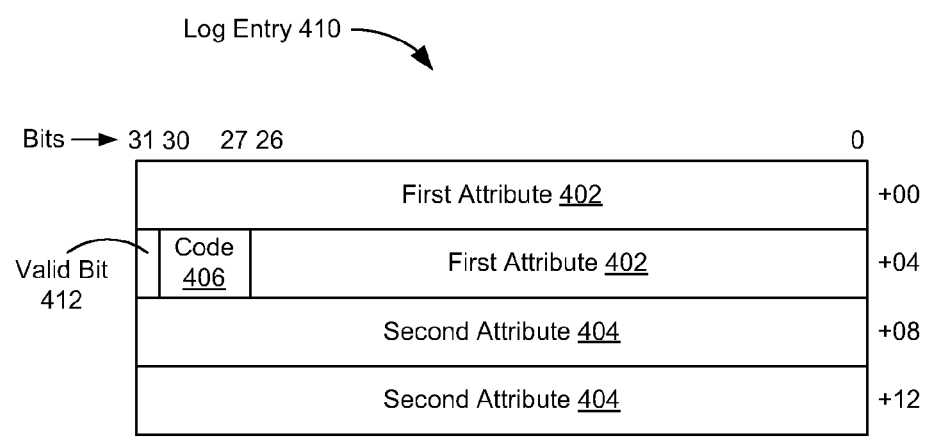

FIG. 4B shows an entry 410 in a log 110 or log 118 in accordance with some embodiments. In addition to the first attribute 402, second attribute 404, and code 406, the entry 410 includes a valid bit 412. When set (e.g., to '1'), the valid bit 412 indicates that the entry 410 is valid, and thus has not yet been consumed by software. The IOMMU 108 or peripheral 116 is configured to create entries 410 with the valid bit 412 set. Software may subsequently reset the valid bit 412 (e.g., to '0') when it consumes the entry 410. When reset, the valid bit 412 indicates that the entry 410 is no longer valid and therefore has been consumed.

Alternatively, the code 406 is used to indicate whether an entry 400 (FIG. 4A) is valid. One or more (e.g., multiple) possible values of the code 406 are specified as indicating that the entry 400 is valid. The IOMMU 108 or peripheral 116 is configured to create entries 400 with codes 406 that indicate that the entries 400 are valid. When software consumes an entry 400, it changes the code 406 to indicate that the entry 400 is now invalid.

As discussed, moving and/or resizing a circular buffer 200 may involve effectively creating a new circular buffer 200. The new circular buffer 200 stores new entries in a log 110 or log 118, while the old circular buffer 200 stores old entries in the log 110 or log 118. Software may not have consumed all of the old entries when the new circular buffer 200 is created. Software may use the valid bit 412 or the code 406 to determine whether respective old entries 410 or 400 are valid and thus are to be consumed. The valid bit 412 or code 406 acts as a validity indicator that allows the software to make this determination in the absence of the head and tail pointer for the old circular buffer 200, which were reset as part of creating the new circular buffer 200.

Figure 5A:
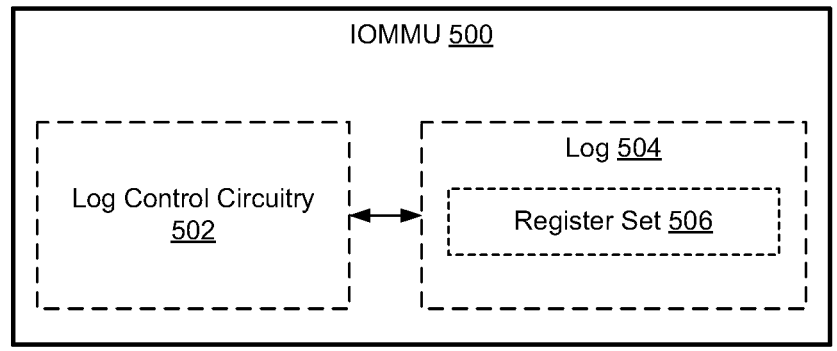
FIG. 5A is a block diagram of a portion of an IOMMU with a single set of registers for a log in accordance with some embodiments.

FIG. 5A is a block diagram of a portion of an IOMMU 500 in accordance with some embodiments. The IOMMU 500 is an example of an IOMMU 108 (FIGS. 1A-1B). Log control circuitry 502 is coupled to a log 504, which is an example of a log 110 (FIGS. 1A-1B). The log 504 may be implemented using a circular buffer 200 (FIG. 2). The log 504 has a register set 506 that includes, for example, the register fields 202-1 through 202-4 (FIG. 2). The log control circuitry 502 is configured to create entries in the log 504 that have valid indicators (e.g., set valid bits 412, FIG. 4B, or valid codes 406, FIG. 4A). The log control circuitry 502 is also configured to perform an atomic operation in which new values for the base address and size of the log 504 are specified and the head and tail pointers are reset. By performing the atomic operation, the log control circuitry 502 thus changes the base address and size of the log 504. This atomic operation may be performed, for example in response to a software command. In some embodiments, the log control circuitry is further configured to increase the size of the log 504 without moving the log 504 and without resetting the head and tail pointers (e.g., if the bit in the register field 312, FIG. 3B, is set).

Figure 5B:
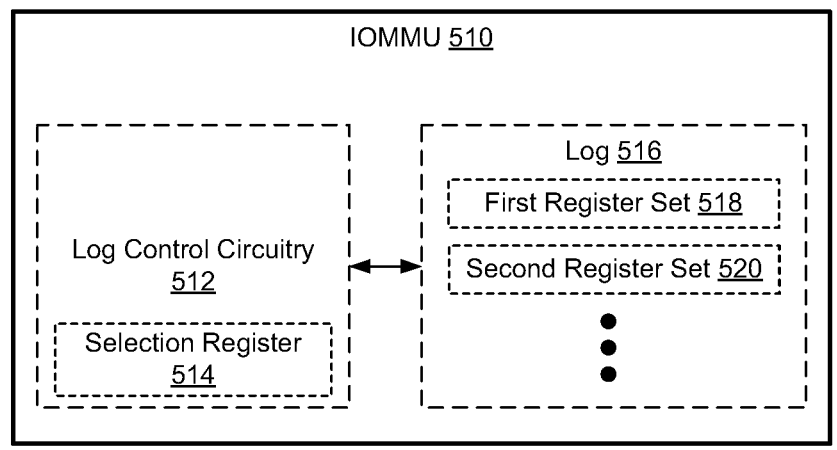
FIG. 5B is a block diagram of a portion of an IOMMU with multiple sets of registers for a log in accordance with some embodiments.

FIG. 5B is a block diagram of an alternative IOMMU 510 in accordance with some embodiments. The IOMMU 510 is another example of an IOMMU 108 (FIGS. 1A-1B). The log 516 in the IOMMU 510 includes a first register set 518 and a second register set 520, and may include additional register sets. The first register set 518, second register set 520, and any additional register sets each correspond to a respective circular buffer 200 and include, for example, a tail pointer register field 202-1, base address register field 202-2, size register field 202-3, and head pointer register field 202-4. Each register set thus includes an instance of the register fields 202 (FIG. 2) in accordance with some embodiments.

To move or resize the log 516, log control circuitry 512 specifies values for the register fields in a respective register set (e.g., the second register set 520) and activates the register set by storing a corresponding selection value in a selection register 514 (or a selection register field, which may be in a dedicated selection register 514 or a wider register). If the log 516 includes only two register sets 518 and 520, the selection value may be a single bit. If the log 516 includes more than two register sets, the selection value is a multi-bit value. The log control circuitry 512 may perform these operations, for example, in response to a software command, or in response to a determination by the log control circuitry 512 that the log 516 is approaching a potential overflow condition (e.g., that a predefined condition indicative of an overflow condition is satisfied). Alternatively, base address register fields 202-2 and/or size register fields 202-3 for respective register sets are specified in advance, and head pointer register fields 202-4 and tail pointer register fields 202-1 are configured (e.g., set to be equal) in advance. Respective register sets may then be selected on the fly by the log control circuitry 512 (e.g., in response to a software command or potential overflow). In either of these manners, the log 516 may seamlessly transition from use of a first circular buffer 200 to use of a second circular buffer 200, without interrupting I/O activity. This seamless transition effectively changes the base address and/or size of the log 516.

A register set that was previously in use (e.g., the first register set 518) remains accessible through the control circuitry 512 (e.g., by changing the selection value in the selection register 514) and therefore may be used to access older entries in the log 516 (e.g., for consumption by software).

In some embodiments, the log control circuitry 512 creates entries that have valid indicators (e.g., that have set valid bits 412, FIG. 4B, or valid codes 406, FIG. 4A). Alternatively, valid indicators are omitted; instead, the head and tail pointers from previously used register sets remain available and may be used to consume old entries in the log 516. Once old entries have been consumed, the corresponding memory may be repurposed.

In some embodiments, a peripheral 116 may include log control circuitry 502 and a log 504, by analogy to FIG. 5A, or log control circuitry 512 and a log 516, by analogy to FIG. 5B. The log 504 and log 516 thus may be examples of a log 118 and/or of a log 110 (FIGS. 1A-1B).

Figure 6A:
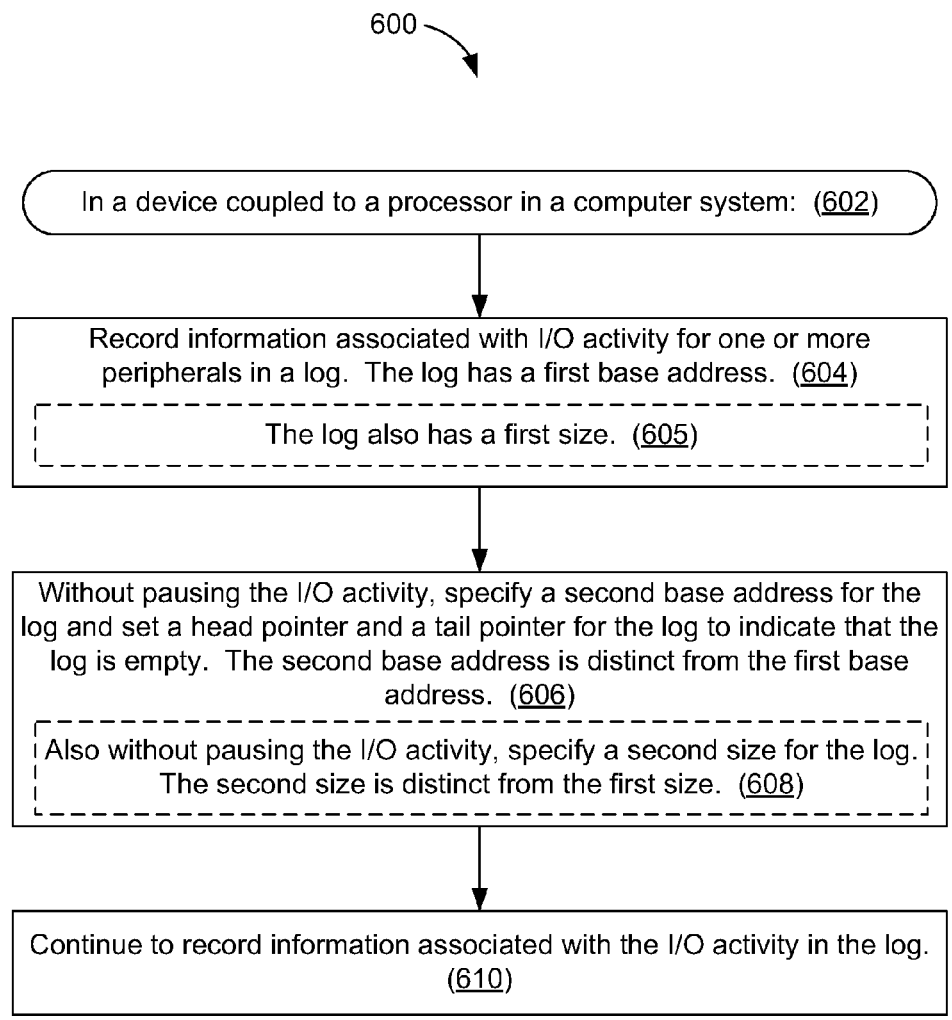
FIGS. 6A-6C are flowcharts showing methods of managing peripherals in accordance with some embodiments.

FIG. 6A is a flowchart showing a method 600 of managing peripherals 116 in accordance with some embodiments. The method 600 is performed (602) in a device (e.g., an IOMMU 108 or peripheral 116, FIGS. 1A-1B) coupled to a processor (e.g., the one or more CPUs 102, FIGS. 1A-1B) in a computer system (e.g., the computer system 100A or 100B, FIGS. 1A-1B). For example, the method 600 may be performed in an IOMMU 500 or 510 (FIGS. 5A-5B).

In the method 600, information associated with I/O activity for one or more peripherals 116 is recorded (604) in a log 110 or log 118 (e.g., a log 504 or 516, FIGS. 5A-5B). The 110 or log 118 has a first base address (e.g., a current base address) and may also have (605) a first size (e.g., a current size).

Without pausing the I/O activity, a second (e.g., new) base address is specified (606) for the log 110 or log 118. The second base address is distinct from the first base address. Head and tail pointers for the log 110 or log 118 are set (606) to indicate that the log is empty. In some embodiments, a second (e.g., new) size for the log 110 or log 118 is also specified (608), without pausing the I/O activity. The second size is distinct from the first size. These values are specified, for example, in the register fields 202-1 through 202-4 (FIG. 2) (e.g., in a register set 506, FIG. 5A, or one or the register sets 518, 520, etc., FIG. 5B).

Information associated with the I/O activity continues (610) to be recorded in the log 110 or log 118. The method 600 thus allows the log 110 or log 118 to be moved and/or resized without interrupting the I/O activity.

Figure 6B:
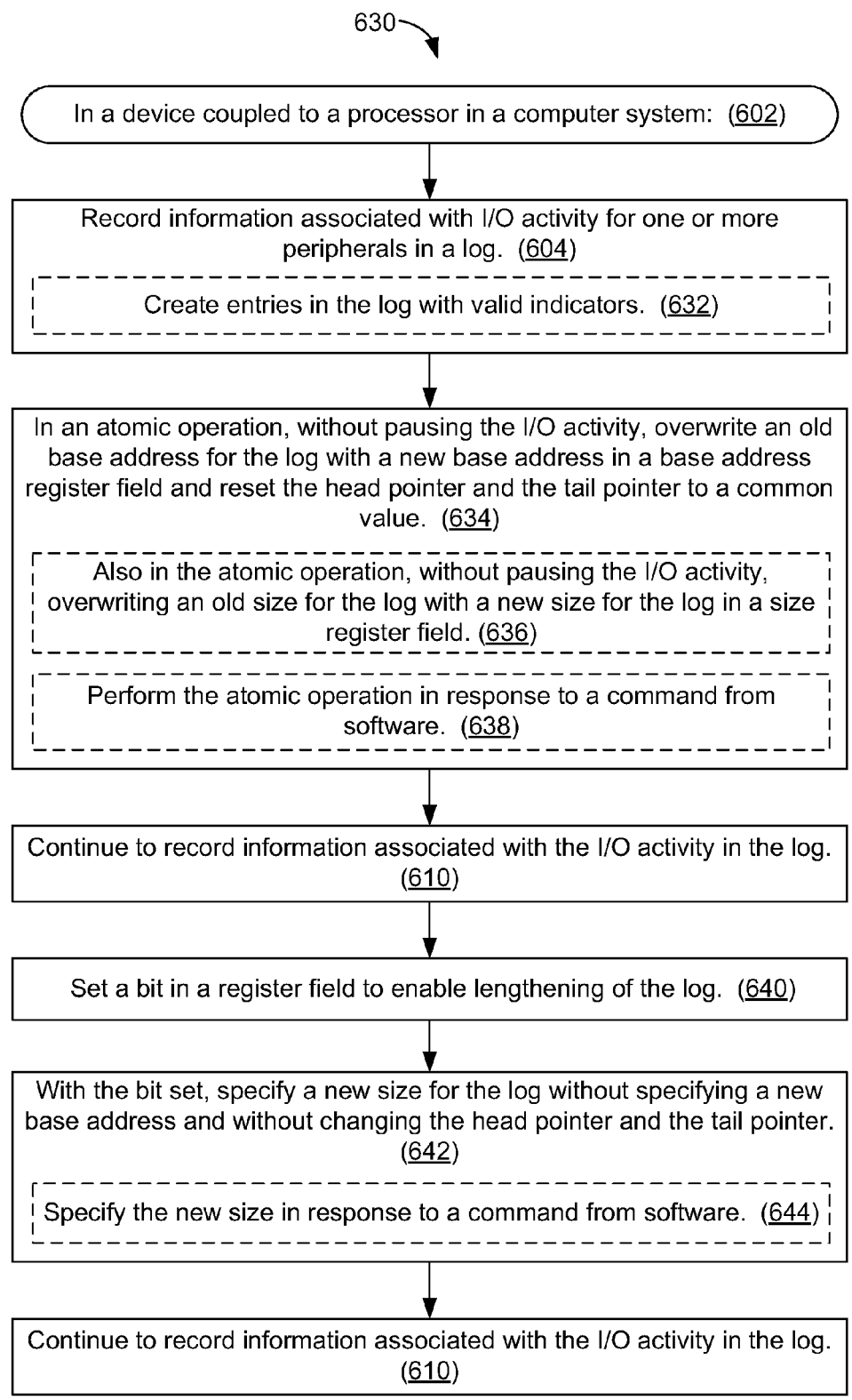

FIG. 6B is a flowchart showing a method 630 of managing peripherals 116 in accordance with some embodiments. The method 630 is performed (602) in a device (e.g., an IOMMU 108 or peripheral 116, FIGS. 1A-1B) coupled to a processor (e.g., the one or more CPUs 102, FIGS. 1A-1B) in a computer system (e.g., the computer system 100A or 100B, FIGS. 1A-1B). For example, the method 630 may be performed in an IOMMU 500 (FIG. 5A).

The operation 604 is performed as described for the method 600 (FIG. 6A). In some embodiments, recording (604) the information associated with the I/O activity in the log 110 or log 118 includes creating (632) entries 204 in the log 110 or log 118 with valid indicators. For example, the entries 204 include valid bits 412 (FIG. 4B), which are set when the entries 204 are created. In another example, a specified field (e.g., for a code 406, FIG. 4A) in the entries 204 is set to a valid value (e.g., to one of a plurality of predefined valid values).

In an atomic operation, without pausing the I/O activity, an old base address for the log 110 or log 118 is overwritten (634) with a new base address in a base address register field 202-2 and head and tail pointers for the log 110 or log 118 are reset (634) to a common value (e.g., as stored in the head pointer register field 202-4 and tail pointer register field 202-1, FIG. 2). In some embodiments, the atomic operation also includes overwriting (636) an old size for the log 110 or log 118 with a new size for the log 110 or log 118 in a size register field 202-3. In some embodiments, the atomic operation is performed (638) in response to a command from software.

Information associated with the I/O activity continues to be recorded (610) in the log 110 or log 118.

The operations 634 and 636 are examples of the operations 606 and 608, respectively, of the method 600 (FIG. 6A). The method 630 to this point is therefore an example of the method 600.

In some embodiments, the method 630 further includes setting (640) a bit in a register field (e.g., the register field 312, FIG. 3B) to enable lengthening of the log 110 or log 118. Setting this bit disables the atomic operation of operation 634. Accordingly, this bit was not set during the operation 634.

With the bit set, a new size for the log 110 or log 118 is specified (642) without specifying a new base address and without changing the head pointer and the tail pointer. The new size is specified, for example, in the size register field 202-3 (FIGS. 2 and 3B). In some embodiments, the new size is specified (644) in response to a command from software.

Information associated with the I/O activity continues to be recorded (610) in the log 110 or log 118.

Figure 6C:
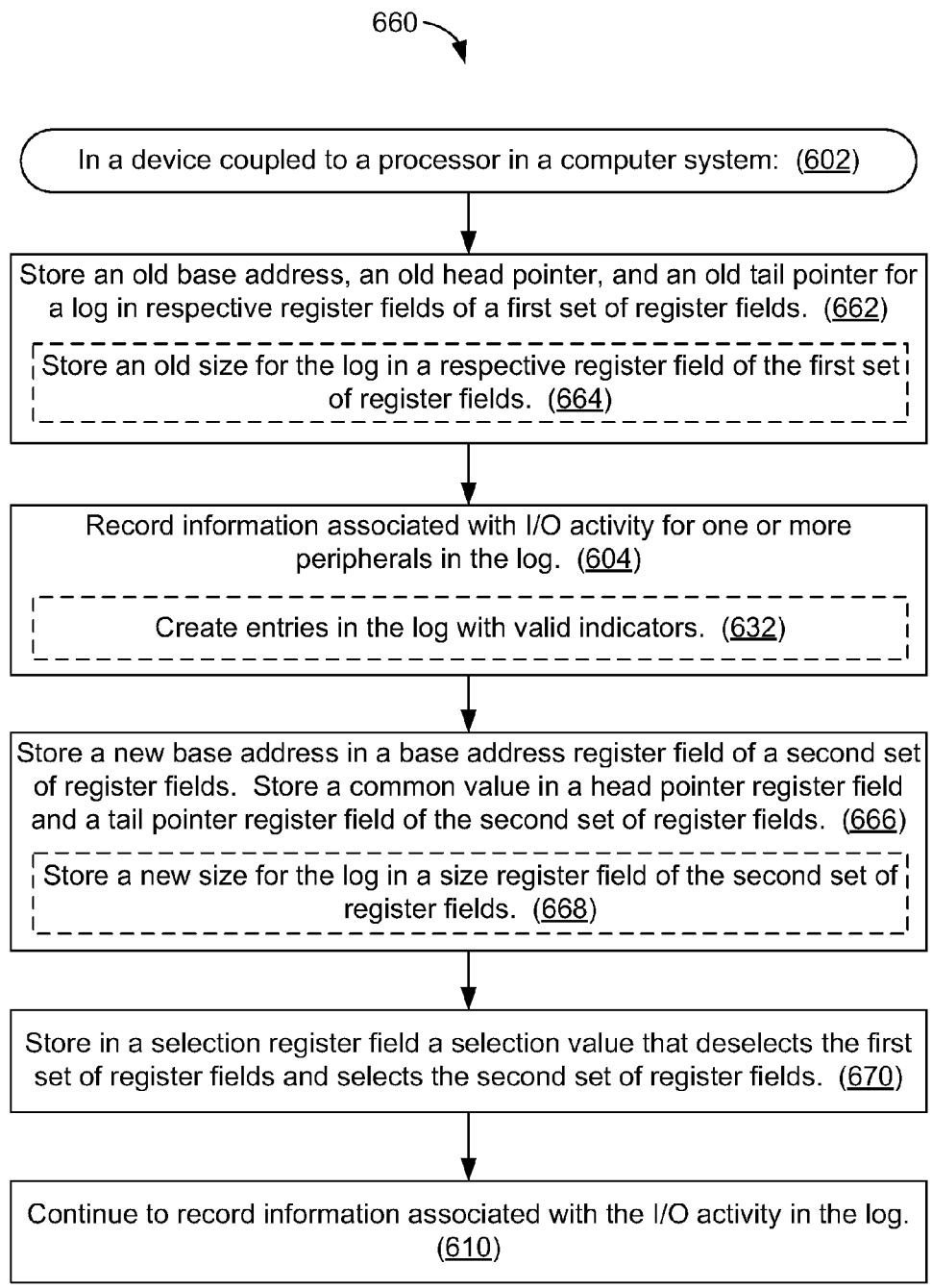

FIG. 6C is a flowchart showing a method 660 of managing peripherals 116 in accordance with some embodiments. The method 660 is performed (662) in a device (e.g., an IOMMU 108 or peripheral 116, FIGS. 1A-1B) coupled to a processor (e.g., the one or more CPUs 102, FIGS. 1A-1B) in a computer system (e.g., the computer system 100A or 100B, FIGS. 1A-1B). In some embodiments, the method 660 is an example of the method 600 (FIG. 6A).

An old base address, an old head pointer, and an old tail pointer for a log 110 or log 118 are stored (662) in respective register fields of a first set of register fields (e.g., the first register set 518, FIG. 5B). In some embodiments, an old size for the log 110 or log 118 is also stored (664) in a respective register field of the first set of register fields. The old base address, old head pointer, old tail pointer, and old size correspond to a first circular buffer 200 (FIG. 2) used for the log 110 or log 118.

Information associated with the I/O activity is recorded (604) in the log 110 or log 118, as described for the method 600 (FIG. 6A) and in accordance with the values stored in the operations 662 and 664. In some embodiments, entries in the log 110 or log 118 are created (632) with valid indicators, as described for the method 630 (FIG. 6B). Alternatively, valid indicators are omitted. The old head and tail pointers are updated as entries are created.

A new base address is stored (666) in a base address register field of a second set of register fields (e.g., the second register set 520, FIG. 5B). In addition, a common value is stored (666) in a head pointer register field and a tail pointer register field of the second set of register fields. In some embodiments, a new size for the log 110 or log 118 is stored (668) in a size register field of the second set of register fields. The new base address, new head pointer, new tail pointer, and new size correspond to a second circular buffer 200 (FIG. 2) to be used for the log 110 or log 118. The second circular buffer 200 is empty, as indicated by the common value for the head and tail pointers.

A selection value that selects the second set of register fields and deselects the first set of register fields (and any additional sets of register fields) is stored (670) in a selection register field (e.g., in the selection register 514, FIG. 5). The selection value overwrites a previous value in the selection register field that selected the first set of register fields and deselected the second set of register fields (and any additional sets of register fields). The second circular buffer 200 is now activated and the first circular buffer 200 deactivated. The operation 670 is performed, for example, in response to a determination by the log control circuitry 512 that overflow of the log 110 or log 118 is imminent (e.g., because the log 110 or log 118 is full or a predefined criterion is otherwise satisfied), or in response to a software command to move or resize the log 110 or log 118.

Information associated with the I/O activity continues to be recorded (610) in the log 110 or log 118, using the second circular buffer 200.

While the methods 600, 630, and 660 include a number of operations that appear to occur in a specific order, it should be apparent that the methods 600, 630, and 660 can include more or fewer operations, some of which can be executed serially or in parallel. An order of two or more operations may be changed, performance of two or more operations may overlap, and two or more operations may be combined into a single operation.

Figure 7:
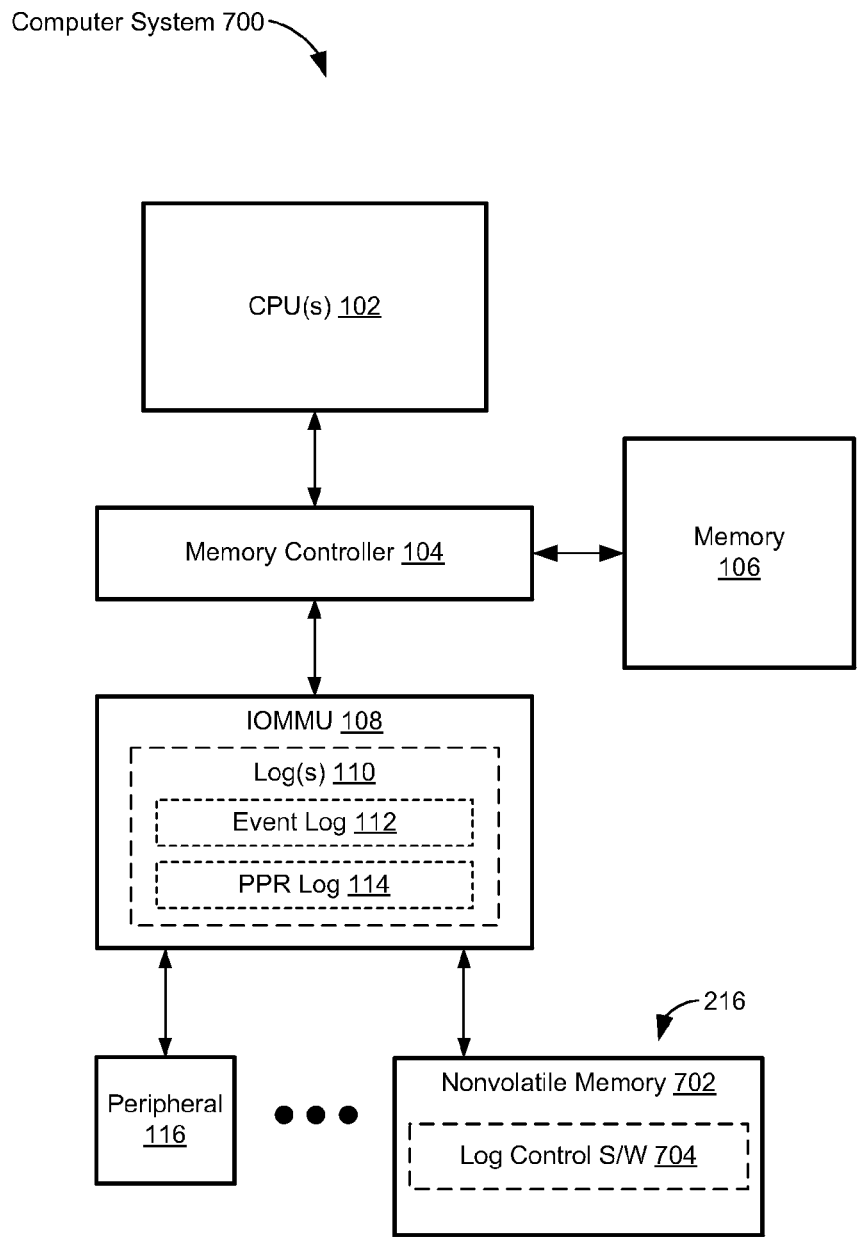
FIG. 7 is a block diagram of a computer system including nonvolatile memory in accordance with some embodiments.

FIG. 7 is a block diagram of a computer system 700 in which one of the peripherals 216 is a nonvolatile memory 702 in accordance with some embodiments. The computer system 700 is an example of a computer system 100A (FIG. 1A). The nonvolatile memory 702 includes a non-transitory computer-readable storage medium storing one or more programs with instructions configured for execution by the one or more CPUs 202. The one or more programs include log control software 704. The log control software 704 includes instructions to issue a command to the IOMMU 108 or a peripheral 116 that causes the IOMMU 108 or peripheral 116 to perform the operations 606 and/or 608 (FIG. 6A), the operations 634, 636, and/or 638 (FIG. 6B), or the operations 666 and/or 668 (FIG. 6C). For example, the log control software 704 includes instructions to write to a base address field 202-2 and a size register field 202-3 (FIG. 2) (e.g., in a register set 506, FIG. 5A, or in the first and second register sets 518 and 520, FIG. 5B). The log control software 704 may also include instructions to write to the selection register 514 (FIG. 5B) and/or the register field 312 (FIG. 3B). The log control software 704 further includes instructions to track and update the variables 206 (FIG. 2) and to read, and thus consume, entries 204 in circular buffers 200 (FIG. 2).

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. A method of managing peripherals, comprising:
in a device coupled to a processor in a computer system:
recording information associated with I/O activity for one or more peripherals in a log having a first base address; and
without pausing the I/O activity and while continuing to record I/O activity in the log, specifying a second base address for the log and setting a head pointer and a tail pointer for the log to indicate that the log is empty, wherein the second base address is distinct from the first base address.

2. The method of claim 1, wherein:
the log has a first size associated with the first base address; and
the method further comprises specifying a second size for the log without pausing the I/O activity, wherein the second size is distinct from the first size.

3. The method of claim 1, wherein:
specifying the second base address comprises overwriting the first base address with the second base address in a first register field; and
setting the head pointer and the tail pointer to indicate that the log is empty comprises resetting the head pointer and the tail pointer to a common value;
wherein the specifying and the setting are performed in an atomic operation in response to a command from software.

4. The method of claim 3, further comprising, in the atomic operation, overwriting a first size for the log with a second size for the log in a second register field.

5. The method of claim 3, wherein the command is a first command, the method further comprising:
setting a bit in a register field to enable lengthening of the log; and
with the bit set, and in response to a second command, changing a size for the log without specifying a third base address and without changing the head pointer and the tail pointer.

6. The method of claim 1, wherein:
the log comprises a plurality of entries; and
the recording comprises creating the entries with valid indicators.

7. The method of claim 1, further comprising storing the first base address, a first head pointer, and a first tail pointer for the log in respective register fields of a first set of register fields, wherein:
specifying the second base address for the log comprises:

storing the second base address in a base address register field of a second set of register fields; and storing in a selection register field a selection value that deselects the first set of register fields and selects the second set of register fields.

8. The method of claim 7, wherein setting the head pointer and the tail pointer for the log comprises storing a common value in a head pointer register field and a tail pointer register field of the second set of register fields.

9. The method of claim 7, further comprising:
storing a first size for the log in a respective register field of the first set of register fields; and
storing a second size for the log in a size register field of the second set of register fields.

10. The method of claim 7, wherein the selection value that deselects the first set of register fields and selects the second set of register fields is stored in the selection register field in response to a determination that log the is full.

11. The method of claim 1, wherein the log records errors associated with the one or more peripherals.

12. The method of claim 1, wherein the log comprises a peripheral page request (PPR) log to store PPRs from the one or more peripherals.

13. A device to be coupled to a processor in a computer system, comprising:
a log to record information associated with I/O activity for one or more peripherals; and
log control circuitry to change a base address for the log and set a head pointer and a tail pointer for the log to indicate that the log is empty, without pausing the I/O activity or halting recording I/O activity in the log.

14. The device of claim 13, wherein:
the log comprises a base address register field, a head pointer register field, and a tail pointer register field; and
the log control circuitry is to perform an atomic operation, in response to a command from software, in which a first base address is overwritten with a second base address in the base address register field and a common value is stored in the head pointer register field and the tail pointer register field to reset the head pointer and the tail pointer.

15. The device of claim 14, wherein:
the log further comprises a size register field; and
the log control circuitry is to overwrite a first size with a second size in the size register field as part of the atomic operation.

16. The device of claim 14, wherein:
the log comprises a plurality of entries; and
the log control circuitry is to create the entries with valid indicators.

17. The device of claim 13, wherein:
the log comprises multiple sets of register fields;
each of the multiple sets of register fields comprises respective register fields to store a base address, a head pointer, and a tail pointer for the log; and
the log control circuitry comprises a register field to store a selection value that selects one of the multiple sets of register fields for use in recording the information associated with the I/O activity.

18. The device of claim 17, wherein each of the multiple sets of register fields further comprises a size register field to store a size for the log.

19. The device of claim 13, wherein:
the device further comprises a register field, associated with the log, to store a bit to enable lengthening of the log; and
the log control circuitry is to lengthen the log without changing the base address for the log when the bit is set to a specified value.

20. A non-transitory computer-readable storage medium storing one or more programs configured for execution by a processor, the one or more programs comprising an instruction to issue a command to a device coupled to the processor to change a base address for a log and to set a head pointer and a tail pointer for the log to indicate that the log is empty without pausing I/O activity for one or more peripherals or halting recording I/O activity in the log, wherein the log is to record information associated with the I/O activity.

* * * * *